3,814,727
OZONE-RESISTANT ODORLESS VULCANIZATES
Peter Hartmann, Cologne, Wolfgang Redetzky, Opladen-Quettingen, and Klaus Wagner, Ernst Roos, and Theo Kempermann, Cologne, Germany, assignors to Bayer Aktiengesellschaft, Leverkusen, Germany
No Drawing. Filed Sept. 13, 1972, Ser. No. 288,746
Claims priority, application Germany, Sept. 16, 1971, P 21 46 263.5
Int. Cl. C08c 11/32, 11/44, 11/54
U.S. Cl. 260—45.9 R    8 Claims

ABSTRACT OF THE DISCLOSURE

Object of the invention is a process for the production of odorless ozone-resistant rubber articles by adding to the anti-ozonant of the general formula

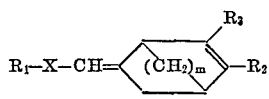

a deodorant of the formula

R—CO—NH—NH$_2$

The deodorant enables the troublesome natural odor to be completely eliminated.

---

It is known from French Patent Specification Nos. 1,575,177 and 7012209 that light-colored ozone resistant rubber articles can be produced from natural and synthetic rubbers and from mixtures thereof in which compounds corresponding to the following general formula (I)

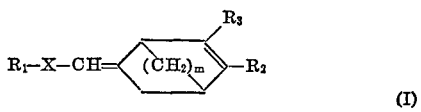

in which $R_1$ represents a hydrocarbon radical which can also be interrupted by heteroatoms, X represents oxygen or sulphur, $R_2$ and $R_3$ represent hydrogen or a methyl radical and $m$ equals 1 or 0, are employed as non-discoloring anti-ozonants.

The hydrocarbon radical $R_1$ is preferably in the form of linear or branched alkyl radicals having from 3 to 18 carbon atoms which may optionally be interrupted by a heteroatom, for example, oxygen or sulphur, aryl radicals, preferably phenyl or naphthyl, and aralkyl radicals which preferably contain phenyl as the aromatic portion and 1 to 3 carbon atoms in the aliphatic chain, in addition to which the chain of the aralkyl radical may optionally be interrupted by a heteroatom such as, for example, oxygen or sulphur.

The following are examples of the cyclohexylidene methyl ethers used:

(cyclohexen-(3)-ylidene methyl)-n-butyl ether,
(3- (or -4)-methylcyclohexen-(3)-ylidene methyl)-n-butyl ether,
(cyclohexen-(3)-ylidene methyl)-n-hexyl ether,
(3- (or -4)-methylcyclohexen-(3)-ylidene methyl)-n-hexyl ether,
(cyclohexen-(3)-ylidene methyl)-isooctyl ether,
(3- (or -4)-methylcyclohexen-(3)-ylidene methyl)-n-octyl ether,
(3- (or -4)-methylcyclohexen-(3)-ylidene methyl)-benzyl ether,
(cyclohexen-(3)-ylidene methyl)-benzyl ether,
(cyclohexen-(3)-ylidene methyl)-isononyl ether,
(cyclohexen-(3)-ylidene methyl)-n-dodecyl ether,
(3- (or -4)-methylcyclohexen-(3)-ylidene methyl)-n-dodecylthio ether,
(3- (or -4)-methylcyclohexen-(3)-ylidene methyl)-4-tert.-butylphenylthio ether,
(cyclohexen-(3)-ylidene methyl)-n-butyl ethylene glycol ether,
(cyclohexen-(3)-ylidene methyl)-ethyl diethylene glycol ether,
(cyclohexen-(3)-ylidene methyl)-phenyl ethylene glycol ether,
(cyclohexen-(3)-ylidene methyl)-cyclohexyl ether,
(2,5-endomethylene cyclohexen-(3)ylidene methyl)-n-hexyl ether,
(2,5-endomethylene cyclohexen-(3)-ylidene methyl)-isooctyl ether,
(2,5-endomethylene cyclohexen-(3-ylidene methyl)-n-dodecyl ether,
(2,5-endomethylene cyclohexen-(3)-ylidene methyl)-benzyl ether,
(2,5-endomethylene cyclohexen-(3)-ylidene methyl)-n-dodecylthio ether,
(cyclohexen-(3)-ylidene methyl)-(2-methylthio ethyl) ether,
(cyclohexen-(3)-ylidene methyl)-(2-phenylthio ethyl) ether.

Unfortunately, all these compounds have a characteristic natural odor, the strength of which varies in dependence upon the content of the compounds in the rubber mixture or in the vulcanizate or end products. The odor can be so intensive that persons exposed to it over a prolonged period, for example in the production or processing of profiles, sheeting or other large-surface products in an enclosed space, can suffer damage to their health.

It is also known that the odor of rubber articles can be harmonized or concealed by the addition of an odor-improving agent (odorant). Unfortunately, the disadvantage of this is that, basically, the odor does not disappear, but instead of new odor note occurs. In most cases, however, rubber articles are required to be completely free from odor.

The object of the present invention is to provide a process which enables the troublesome natural odor to be completely eliminated.

According to the invention, this object is achieved by virtue of the fact that, in addition to the non-discoloring anti-ozonants corresponding to the following general formula (I)

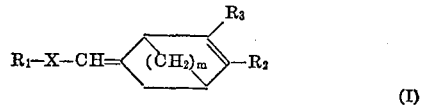

in which $R_1$ represents a hydrocarbon radical which can optionally be interrupted by heteroatoms, X represents oxygen or sulphur, $R_2$ and $R_3$ represent hydrogen or a methyl radical and $m$ equals 1 or 0, compounds corresponding to the following general formula (II)

R—CO—NH—NH$_2$    (II)

in which R represents an alkyl radical with 3 to 10 carbon atoms, are added as deodorants to the rubber mixtures before vulcanization.

The following are examples of the monocarboxylic acid hydrazides of general formula (II) claimed in accordance with the invention:

propionic acid hydrazide,
2-ethyl hexano carboxylic acid hydrazide,
heptano carboxylic acid hydrazide,
decano carboxylic acid hydrazide.

The deodorants claimed in accordance with the invention can readily be dispersed in rubber mixtures and may be used in conjunction with conventional rubber chemicals (for example vulcanization accelerators, vulcanizing agents, antiagers, plasticizers, fillers and waxes).

The compounds of formula II are used in the rubber in quantities of from 5 to 50% by weight and preferably in quantities of from 12 to 25% by weight, based on the quantity by weight of the non-discoloring anti-ozonants introduced into the rubber mixture.

The compounds claimed above as deodorants are produced by methods known from the literature, for example by reacting a carboxylic acid ester with aqueous hydrazine.

Suitable rubbers include, for example, natural rubbers or synthetic rubber-like polymers and polychloroprene which still contain double bonds and which are obtained, for example, from conjugated diolefins, such as butadiene, dimethyl butadiene, isoprene and its homologues, or copolymers of conjugated diolefins such as these with polymerizable vinyl compounds such as styrene, α-methyl styrene, acrylonitrile, methacrylonitrile, acrylates, methacrylates.

The effect of the compounds of formula II in accordance with the invention is demonstrated in the following mixture without being limited to it.

EXAMPLE 1

The following mixtures were prepared on rolls:

| | |
|---|---:|
| SBR rubber (type 102) | 100.0 |
| Zinc oxide | 5.0 |
| Stearic acid | 1.5 |
| Precipitated chalk | 80.0 |
| Precipitated silica (BET surface approx. 80 m.²/g.) | 20.0 |
| Naphthenic mineral oil plasticizer | 12.0 |
| Titanium dioxide | 8.0 |
| Ethylene glycol | 1.5 |
| Sulphur | 2.2 |
| N-cyclohexyl benzthiazyl sulphenamide | 1.3 |
| Tetramethyl thiuram disulphide | 0.15 |
| Anti-ozonant | cf. Table I |
| Deodorant | cf. Table I |

Plates measuring 200 x 200 x 3.8 mm. were press-vulcanized from these mixtures for 30 minutes at 150° C.

TABLE I

| Additives: | Odor |
|---|---|
| No additive (blank test) | No strong odor. |
| 4.0 parts by weight of cyclohexen-3-ylidene methyl benzyl ether. | Very strong odor. |
| 4.0 parts by weight of cyclohexen-3-ylidene methyl benzyl ether plus 1.0 part by weight of propionic acid hydrazide. | No odor. |
| 4.0 parts by weight of cyclohexen-3-ylidene methyl benzyl ether plus 1.0 part by weight of 2-ethyl hexano carboxylic acid hydrazide. | No odor. |
| 4.0 parts by weight of cyclohexen-3-ylidene methyl benzyl ether plus 1.0 part by weight of heptano carboxylic acid hydrazide. | No odor. |
| 4.0 parts by weight of cyclohexen-3-ylidene methyl benzyl ether plus 1.0 part by weight of decano carboxylic acid hydrazide. | No odor. |

What is claimed is:

1. A vulcanizable composition comprising natural rubber, synthetic rubber or a mixture thereof, an anti-ozonant of the formula

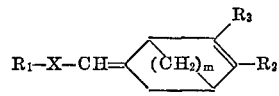

wherein $R_1$ is hydrocarbon or hydrocarbon interrupted by at least one member selected from the group consisting of oxygen and sulfur, X is oxygen or sulphur, $R_2$ and $R_3$ are the same or different and selected from the group consisting of hydrogen and methyl and $m$ is 1 or zero and a deodorant of the formula

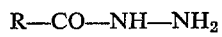

wherein R is alkyl having from 3 to 10 carbon atoms.

2. The vulcanizable composition of claim 1 wherein said deodorant is propionic acid hydrazide.

3. The vulcanizable composition of claim 1 wherein said deodorant is 2-ethyl hexano carboxylic acid hydrazide.

4. The vulcanizable composition of claim 1 wherein said deodorant is heptano carboxylic acid hydrazide.

5. The vulcanizable composition of claim 1 wherein said deodorant is decano carboxylic acid hydrazide.

6. The vulcanizable composition of claim 1 wherein said deodorant is present in an amount of from 5 to 50% by weight, based on the weight of the anti-ozonant.

7. The vulcanizable composition of claim 1 wherein said deodorant is present in an amount of from 12 to 25% by weight, based on the weight of the anti-ozonant.

8. A vulcanized rubber article produced by vulcanizing the composition of claim 1.

References Cited

UNITED STATES PATENTS 3,639,485   2/1972   Nast et al. ......... 260—609
3,689,554   9/1972   Ley et al. .......... 260—557

DONALD E. CZAJA, Primary Examiner

R. A. WHITE, Assistant Examiner

U.S. Cl. X.R.

260—45.7 R, 45.7 S, 45.95 C, 45.95 G, 799, 810